US007324069B2

(12) United States Patent
Weber et al.

(10) Patent No.: US 7,324,069 B2
(45) Date of Patent: Jan. 29, 2008

(54) ANIMATION REVIEW METHODS AND APPARATUS

(75) Inventors: Karon A. Weber, San Francisco, CA (US); Antoine McNamara, San Francisco, CA (US); Maxwell O. Drukman, San Francisco, CA (US); Philip Bradley Bird, Tiburon, CA (US); Brendan Peter Donohoe, Berkeley, CA (US); Michael Boyle Johnson, Oakland, CA (US); Alex Stahl, Oakland, CA (US)

(73) Assignee: Pixar, Emeryville, CA (US)

( * ) Notice: Subject to any disclaimer, the term of this patent is extended or adjusted under 35 U.S.C. 154(b) by 27 days.

(21) Appl. No.: 10/925,190

(22) Filed: Aug. 23, 2004

(65) Prior Publication Data

US 2005/0257137 A1    Nov. 17, 2005

Related U.S. Application Data

(60) Provisional application No. 60/571,334, filed on May 14, 2004.

(51) Int. Cl.
   G09G 5/00       (2006.01)
   G06T 13/00      (2006.01)
   G06T 15/70      (2006.01)
   G06F 3/00       (2006.01)
(52) U.S. Cl. .................. 345/2.2; 345/473; 345/629; 715/723; 715/733
(58) Field of Classification Search ............. 345/1.1, 345/2.1, 2.2, 3.3, 3.4, 156, 163, 173, 473, 345/547, 629, 633, 634, 636; 715/700, 716, 715/719, 720, 723, 726, 730, 733; 725/37
See application file for complete search history.

(56) References Cited

U.S. PATENT DOCUMENTS

| | | | | |
|---|---|---|---|---|
| 5,442,744 A | * | 8/1995 | Piech et al. | 715/500.1 |
| 5,524,193 A | * | 6/1996 | Covington et al. | 715/512 |
| 5,600,775 A | * | 2/1997 | King et al. | 715/500 |
| 5,931,908 A | * | 8/1999 | Gerba et al. | 709/219 |
| 6,091,408 A | * | 7/2000 | Treibitz et al. | 715/753 |
| 6,789,105 B2 | * | 9/2004 | Ludwig et al. | 709/204 |
| 6,816,904 B1 | * | 11/2004 | Ludwig et al. | 709/226 |
| 7,054,904 B2 | * | 5/2006 | Ludwig et al. | 709/205 |
| 7,058,891 B2 | * | 6/2006 | O'Neal et al. | 715/730 |
| 7,075,556 B1 | * | 7/2006 | Meier et al. | 345/629 |
| 7,082,572 B2 | * | 7/2006 | Pea et al. | 715/720 |
| 2002/0149617 A1 | * | 10/2002 | Becker | 345/751 |

* cited by examiner

Primary Examiner—Jeff Piziali
(74) Attorney, Agent, or Firm—Townsend and Townsend and Crew LLP

(57) ABSTRACT

A system comprises a source providing video in a first format, a video converter for converting video from the first to a second format, a server storing a video image from the video, and combining the video image with a graphical user interface to form a composite video, and a first user display device displaying the composite video, and receiving from the user, a plurality of commands, wherein the first user display device is for receiving from the user, a plurality of annotations associated with a video frame from the composite video, and for determining the video frame from the composite video in response to a command, wherein the server is for forming an annotated video in response to the video frame and the plurality of annotations, for storing the plurality of annotations and the video frame, and for associating the plurality of annotations and the video frame.

20 Claims, 6 Drawing Sheets

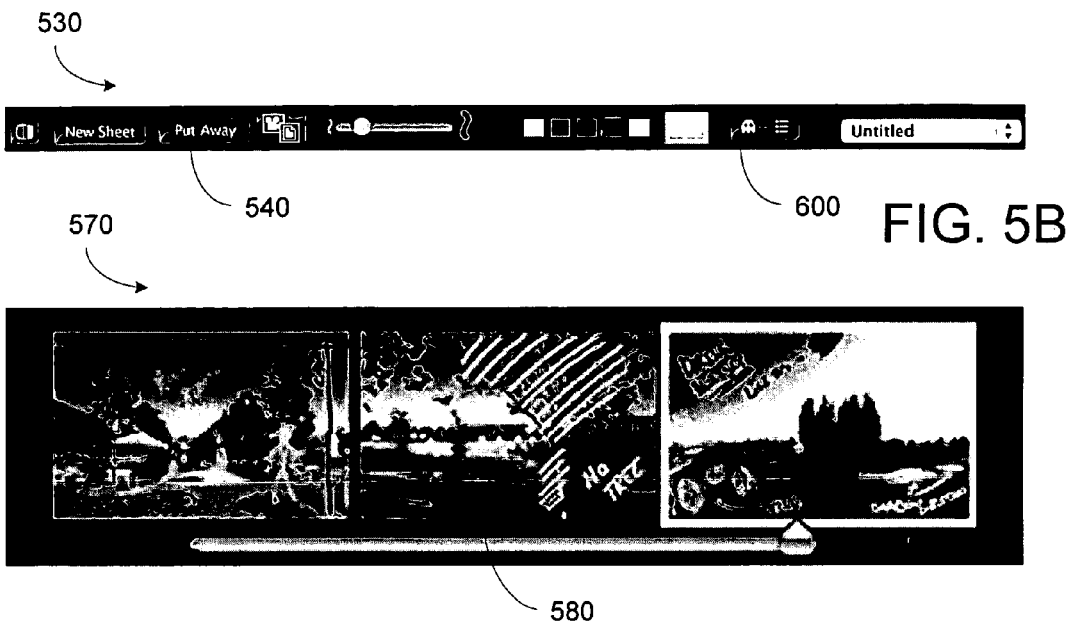
FIG. 5B
FIG. 5C
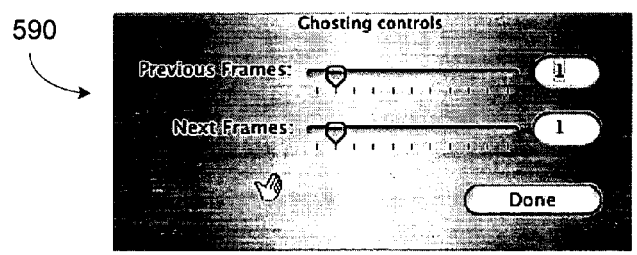
FIG. 5D
FIG. 5E

ANIMATION REVIEW METHODS AND APPARATUS

CROSS REFERENCE TO RELATED APPLICATION

This application claims priority to U.S. Provisional Application No. 60/571,334, filed on May 14, 2004, and is incorporated herein by reference for all purposes.

BACKGROUND OF THE INVENTION

The present invention relates to animation production. More specifically, the present invention relates to systems and methods for making and storing visual annotations to a video signal for directorial review.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer aided animation (CAA) industry was Pixar, dba Pixar Animation Studios. Over the years, Pixar developed and offered both computing platforms specially designed for CAA, and Academy-Award® winning rendering software known as RenderMan®.

In the filmmaking process, a Director must constantly review the visual data being created and provide feedback. This criticism can be conveyed in many ways. Different types of directorial suggestions may use different means of expression. For example, a suggestion about the "mood" of a character may be described by physical acting or by verbal description. However, many filmic elements are visual in nature, and rely on visual feedback. For example, if a Director would like to move a character to a specific location on screen, that suggestion is often conveyed more clearly and efficiently by "showing" the location in the scene. The inventors of the present invention have discovered that advantages of visual feedback are even more important in the domain of computer graphics and animation. In such domains, the Director must convey extremely specific visual information about a character's physical appearance.

The inventors of the present invention had determined several desired traits for visual annotation tools. First, the inventors have determined that methods and systems should be simple and intuitive, because Directors are extremely busy and do not have time to learn how to use computers or learn how to use complicated software. Second, the inventors have determined that the annotation methods and tools should be fast, lightweight, and fit into the current review workflow. Typically, review sessions are fast-paced and cover much material, accordingly, the annotation logistics should be simple. Third, the inventors have determined that annotation tools should be compatible with different types of visual signals. For example, in computer animation, work to be reviewed is sometimes reviewed from digital video, the artist's computer screen, or other source. Finally, the inventors have determined that visual annotation tools should provide users with easy access to the Director's critiques so that users can make appropriate changes and refinements.

At Pixar, two methods were previously used to give users (e.g. animators) visual feedback. One method was for an image to be projected on a screen, and for the Director to use a laser pointer to visually indicate the problem areas.

Drawbacks to this solution was that it was only effective for simple changes and edits, such as, rough positioning of objects in a scene. This solution could not be used to describe complex shapes or changes. Additionally, this solution did not allow the Director's comments to be saved for subsequent review.

Another method was for an image to be projected onto a whiteboard and for the Director to make sketches on the whiteboard. Once the sketch was complete, a digital photograph was taken for later reference.

Drawbacks to this method included that there was significant overhead and it greatly impacted the Director review workflow. For example, reviews were limited to small audiences and small rooms due to the limitations of the whiteboard size. Additionally, projecting images onto a glossy whiteboard significantly diminished the quality of the images. Other drawbacks included that the comments written on the whiteboard could not easily be correlated to the image that was projected. More specifically, a substantial amount of time would have to be spent photographing the images on the white board, organizing the photographs, correlating the images to the projected images, and distributing the projected images and the photographs to users.

In the industry, a number of computerized techniques for annotating information streams currently exists. One approach is to have the user draft textual or graphic notes while viewing a video clip, and record a time stamp in the video clip the moment the note was created. Subsequently, when the notes are reviewed, using the time stamp, the appropriate place in the video clip is located.

These techniques include many significant drawbacks. One drawback is that it imposes a strictly linear notation strategy on the review process. In other words, the Director would have to annotate the video as it were being shown. If the Director made comments regarding a portion of the video and later wanted to make further comments on the portion of the video, a new time stamp would be recorded for the portion of the video. To a user making revisions, changes to the portion would be made twice: once in response to the Director's first comments, and once, later, in response to the further comments.

Another drawback is that these techniques require knowledge of the underlying file format for the video clip in order to insert the time stamps. In other words, the sources of the video data are limited to ones which are output by a computer. Further, to support additional and new computerized video formats would require significant reengineering. Accordingly, these techniques are very limiting and inflexible.

Accordingly, what is desired are improved methods and apparatus addressing the drawbacks discussed above.

BRIEF SUMMARY OF THE INVENTION

The present invention relates to systems and methods of animation production. More specifically, the present invention relates to systems and methods for making and storing visual annotations to a video signal for directorial review.

Embodiments of the present invention provide a system and method for Directorial reviews that supports graphical sketching and sketch management. More specifically, embodiments of the present invention provide a user (e.g. a Director) with full sketching annotation capability on images derived from arbitrary video sources. In various embodiments, sketches can be easily created using this system, with minimal impact to a review workflow. Furthermore, the sketches are automatically associated to the image(s) being critiqued. In various embodiments, the system makes the sketches and the source images accessible to other users.

In the present embodiments, two primary modes of operation are provided. A first mode is a "video playback" mode, where a video signal is displayed to the video output device. During this mode, the user can take one or more "snapshots" (freeze-frames, frame grabs) of the video signal. A second mode is a "sketching" mode, where drawing tools are enabled and the user (e.g. Director) can make sketches on top of the snapshots. With embodiments of the present invention, arbitrary video sources are translated and output in a digital video (DV) format.

In embodiments of the present invention, the system described is designed such that the impact on a traditional Director review workflow is reduced. Accordingly, when video source material is projected on a screen and the user (e.g. Director) wishes to make a visual comments, the user can easily do so. Using a combined display and input device, the user can directly "draw" or "sketch" on top of the image to annotations and to request changes in the video images. These changes can be viewed by other users during the review session for discussion purposes or off-line for correction purposes. After the review session critique, the created sketches are associated with the video image. The sketches and associated video images may be put on a network, so that one or more users can view the visual comments.

The inventors of the present invention have determined that making sketches to a video signal involves many problems. For example, substantial hardware is required to provide smooth drawing over full-screen moving images. Additionally, it is often unclear which image the sketch may refer to. For example, the sketch might refer to the frame of animation on which drawing began, the frame on which it was completed, or the entire video sequence (much of which may be unrelated). The inventors have also determined that this issue may lead to asset management problems, such as associating a sketch with the correct video image.

In embodiments of the present invention, to solve such issues, the inventors determined that an intuitive sketching paradigm was to allow sketching over still images. In the case a user (e.g. Director) wants to make multiple annotations on a video clip, the user may take "snapshots" during the clip. The user can then sketch on each one of the "snapshots" or "sheets." In additional embodiments, the user may make annotations onto more than one overlays over a video clip. These multiple overlays may be displayed at the same time over an image in the same way as traditional animation "onion-skinning." Additionally, the user may illustrate changes in time using the multiple overlays.

In various embodiments, the review process typically occurs on a "shot" by "shot" basis, as known in the industry. In other words, after one shot is displayed and annotated, the next shot is displayed and annotated, and the like. Shots may be of any length, for example, a shot may be 150 frames of animation, or a greater or lesser number of frames. In the present embodiment, the video data is provided by the video source and is typically looped over and over, until the next shot is to be reviewed.

According to one aspect of the invention, a method for a computer system is disclosed. One technique may include receiving video data from a video source, wherein the video data comprises a plurality of video images, combining the plurality of video images with a first graphical user interface to form a first review user interface, and displaying the first review user interface to a plurality of users on user display devices. Techniques may also include receiving a first command from a user from the plurality of users from a user input device, determining a video image from the plurality of video images in response to the first command, combining the video image with a second graphical user interface to for a second review user interface, and displaying the second review user interface to the plurality of users on user display devices. Other methods include receiving a second command from the user from the user input device, determining annotation parameters in response to the second command, receiving a graphical selection of annotation positions on the second review user interface associated with the video image from the user from the user input device, determining annotation positions in the video image in response to the graphical selection of annotation positions on the second review user interface, modifying values of pixels associated with the annotation positions in the video image to form an annotated second review user interface in response to the annotation parameter, and displaying the annotated second review user interface to the plurality of users on user display devices. Techniques may also include storing the video image, and a representation of the annotations in the video image in memory.

According to one aspect of the invention, a review system is disclosed. One system includes a video source configured to provide video data, wherein the video data comprises a plurality of video images, and a server coupled to the video source, wherein the server is configured to form a first review user interface comprising a first region including a video image from the plurality of video images, and a second region including a first graphical user interface. The system may also include a first user interface device coupled to the server, wherein the first user interface device includes a display configured to display the first review user interface to a user, wherein the first user interface device includes a user input device configured to receive from the user, a first user selection of a plurality of pixels within the first region;

and wherein the user input device is also configured to receive from the user, a second user selection of a pixel within the second region. In various configurations, the first user selection is associated with a user annotation on the video image, and the second user selection is associated with a desired user command. In various apparatus, the server is also configured to perform the desired user command in response to the second user selection, the server is also configured to modify values of the plurality of pixels in response to the first user selection, the server is configured to form a modified first review user interface in response to the plurality of pixels with modified values, and the server is configured to associate and store the user annotation with the video image. The display of the first user interface device is also configured to display the modified first review user interface.

According to one aspect of the invention, a computer program product for a computer system including a processor and display is disclosed. The computer program product may include code that directs the processor to receive video data from a video source, wherein the video data comprises a plurality of video images, code that directs the processor to determine a video image from the plurality of video images in response to a command from a user at a user input device, code that directs the processor to combine the video image with a first graphical user interface to form a first review user interface, and code that directs the processor to output the first review user interface to a plurality of users on user display devices. Other configurations include code that directs the processor to receive graphical selections of positions on the first review user interface associated with the video image from the user from the user input device, code that directs the processor to determine positions on the video image in response to the graphical selection of positions on the second review user interface, code that directs the processor to modify values of pixels in an overlay layer associated with the positions in the video image to form an annotated first review user interface, and code that directs the processor to output the annotated first review user interface to the plurality of users on user display devices. Various configurations include code that directs the processor to store the video image and a representation of the overlay layer in memory. The codes may reside on a tangible media such as a magnetic memory, optical memory, semiconductor memory, or the like.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Figure 1:
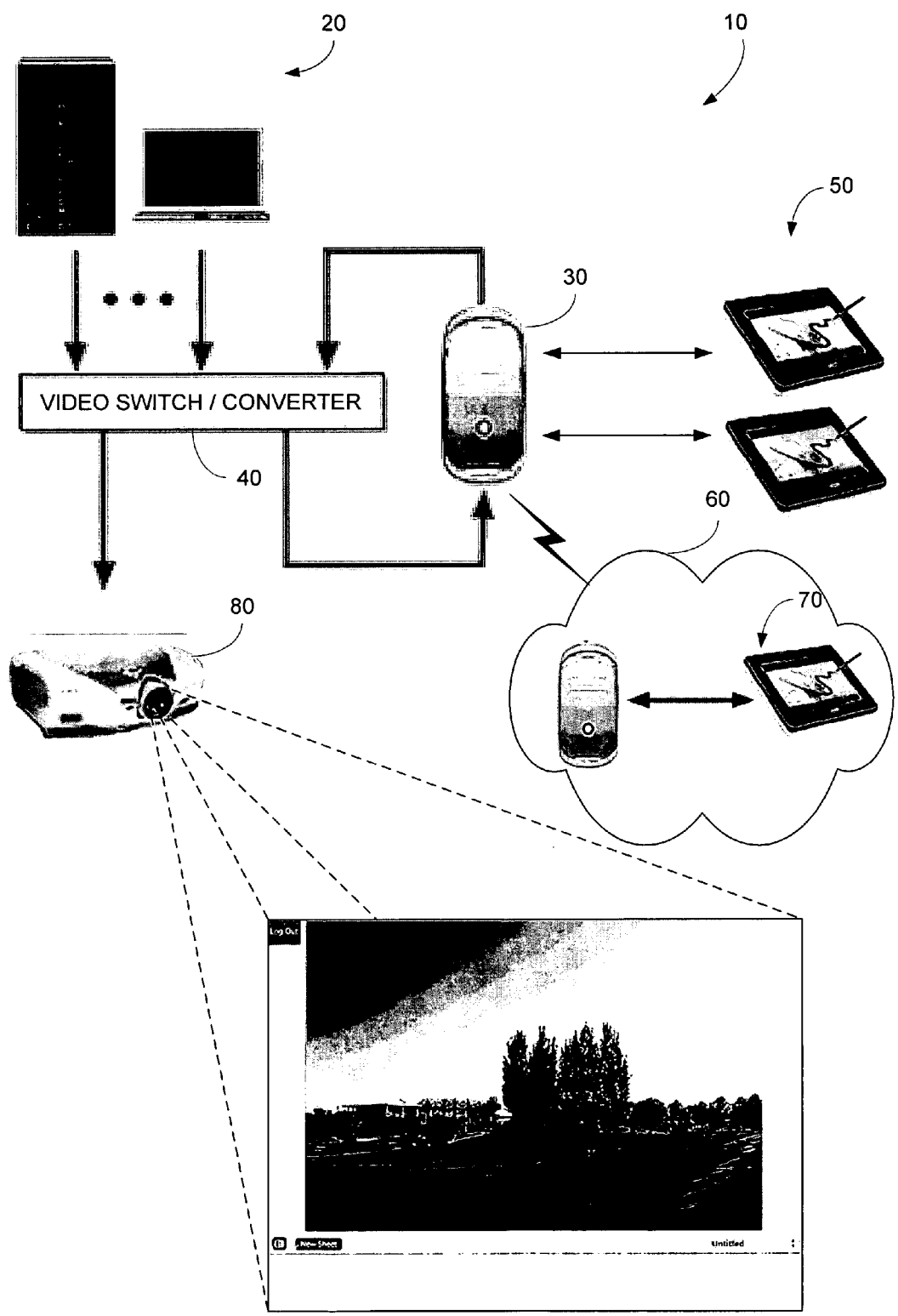

FIG. 1 illustrates a system 10 according to an embodiment of the present invention. In FIG. 1, video data from a variety of video sources 20 are provided to server 30. A video switch/converter 40 may be provided including a conversion portion to convert the video data into the appropriate format for server 30. In this embodiment, a number of users view processed video data from server 30 via user interface devices 50. As shown, users at remote locations 60 may also view the processed video data with a similar user interface device 70. In the illustrated embodiment, a user display device 80, may also be provided for displaying the processed video data to more than one user at a time.

In various embodiments, a conversion portion converts the video data stream from video source 20 in a first format, to a desired format. In one embodiment, the video signals from video sources 20 are a VGA output video signals. These signals are converted from VGA format into digital video (DV) format using standard available off-the-shelf video converters.

In the present embodiments, video data from a number of video sources 20 can be provided to video switch/converter 40. In some embodiments, the video signal is a computer display signal, such as VGA, XGA, or the like. In various embodiments, the video data may be analog video data, from a computer, or the like. Further, the video signal may be an s-video signal, NTSC signal, component video signals, or the like.

In the present embodiment, the conversion portion of video switch/converter 40 converts the video data streams from one or more signal formats, into a Digital Video (DV). In other embodiments, the video data streams may be converted to other formats, such as MPEG-4, MPEG-1, QuickTime, or the like. Additionally, the resolution of the video data may be modified. For example, in a DV embodiment, the horizontal resolution is ~500 lines, whereas in a 480 p embodiment, the horizontal resolution is 480 lines, and in a 1080 p embodiment, the horizontal resolution is >1000 lines. The resolution and signal format may be modified for specific embodiments. In the present embodiment, it is believed that any conventional off-the-shelf hardware may be used to perform the above functionality.

Figure 4:
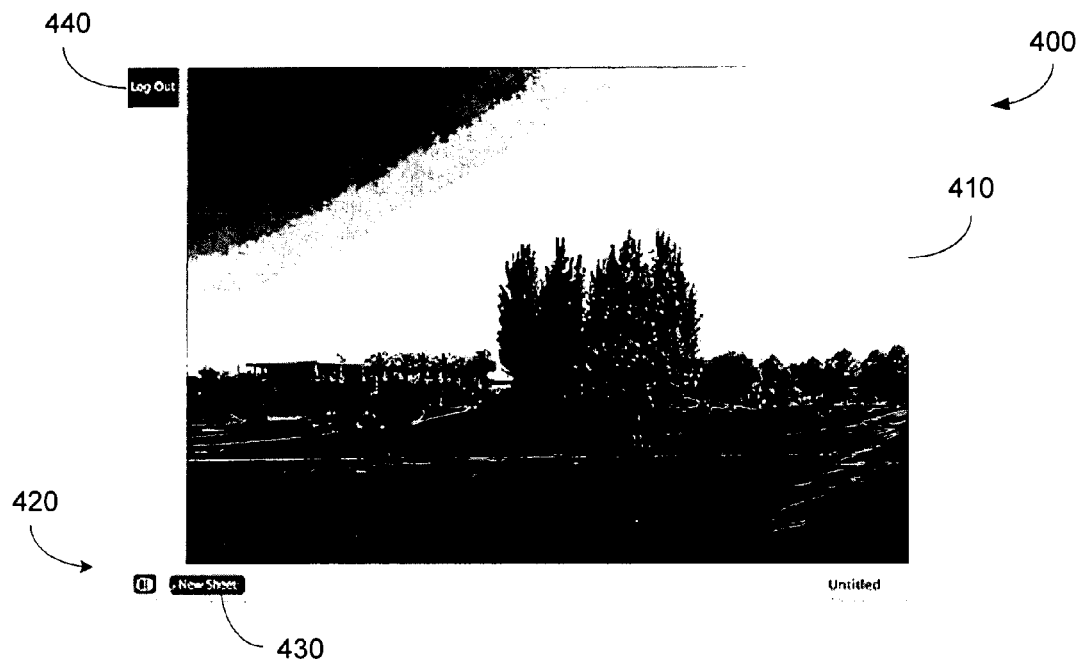

In this embodiment, a switching portion of video switch/converter 40 provides the received video data streams to server 30. Additionally, the switching portion of video switch/converter 40 receives video data from server 30, and provides a selected video output signal to user display device 80. For example, user display device 80 may display the received video data streams from video source 20 or one or more graphical user interfaces as illustrated in FIGS. 4-5E.

In embodiments of the present invention, the physical connection between video switch/converter 40 to server 30 may be via FireWire (IEEE 1394) interface. In other embodiments, the connection may be via other computer interfaces, such as USB2.0, SCSI-2, or the like. In various embodiments, server 30 may store DV format video. Server 30 may directly store the DV format video, or convert and store the video data into another format. In various embodiments, server 30 may convert and/or store the video data in MPEG-4, MPEG-1, QuickTime, Divx format, or any other image or video format.

In the present embodiment, server 30 combines the video data received with one or more graphical user interfaces to form "review user interfaces." The "review user interfaces" are then provided to user interface devices 50. Additionally, the "review user interfaces" formed by server 30 are provided to user display device 80 via a video switch portion of video switch/converter 40 for output to one or more users.

In one embodiment, user interface devices 50 are integrated displays and user input devices. For example, user interface devices 50 may include an a display and integrated drawing tablet such as the Cintiq marketed by Wacom Technology, Co. In other embodiments, user interface devices may include a separate display and a drawing tablet, wired or wireless mouse, trackball, or the like. In one embodiment, user interface devices 50 may be coupled to standard video graphics outputs of server 30, and standard interface ports, such as serial ports, USB ports, or the like.

In some embodiments, user interface devices 50 may be tablet-style computers coupled to server 30 via a LAN, or the like. In other embodiments, users at remote locations 60 may also receive output from server 30 (via the Internet, for example). User interface devices 70 may include integrated displays and user input devices, or more conventional separate displays and user input devices.

As will be discussed below, users at user interface devices 50 or 70, or the like, may provide commands to control server 30. Additionally, users at user interface devices 50 or 70, or the like may also provide a number of "graphical annotations" in response to the video data output from server 30. These graphical annotations are associated with specific video images, and are stored in server 30 for future retrieval and review.

In various embodiments, server 30 combines the graphical annotations back into the "review user interfaces." Accordingly, users at user interface devices 50, 70, or the like see each other's graphical annotations is real-time or near real-time.

In the example in FIG. 1, the review user interface is also projected through user display device 80. In various embodiments, user display device 80 may include a plasma display, LCD display, front or rear projection display, DLP-based projection system, or the like. It is contemplated by the inventors that users will tend to observe output from user display device 80 to watch the video data stream, and that users will tend to rely on user interface devices 50, 70, or the like for making graphical annotations.

Figure 2:
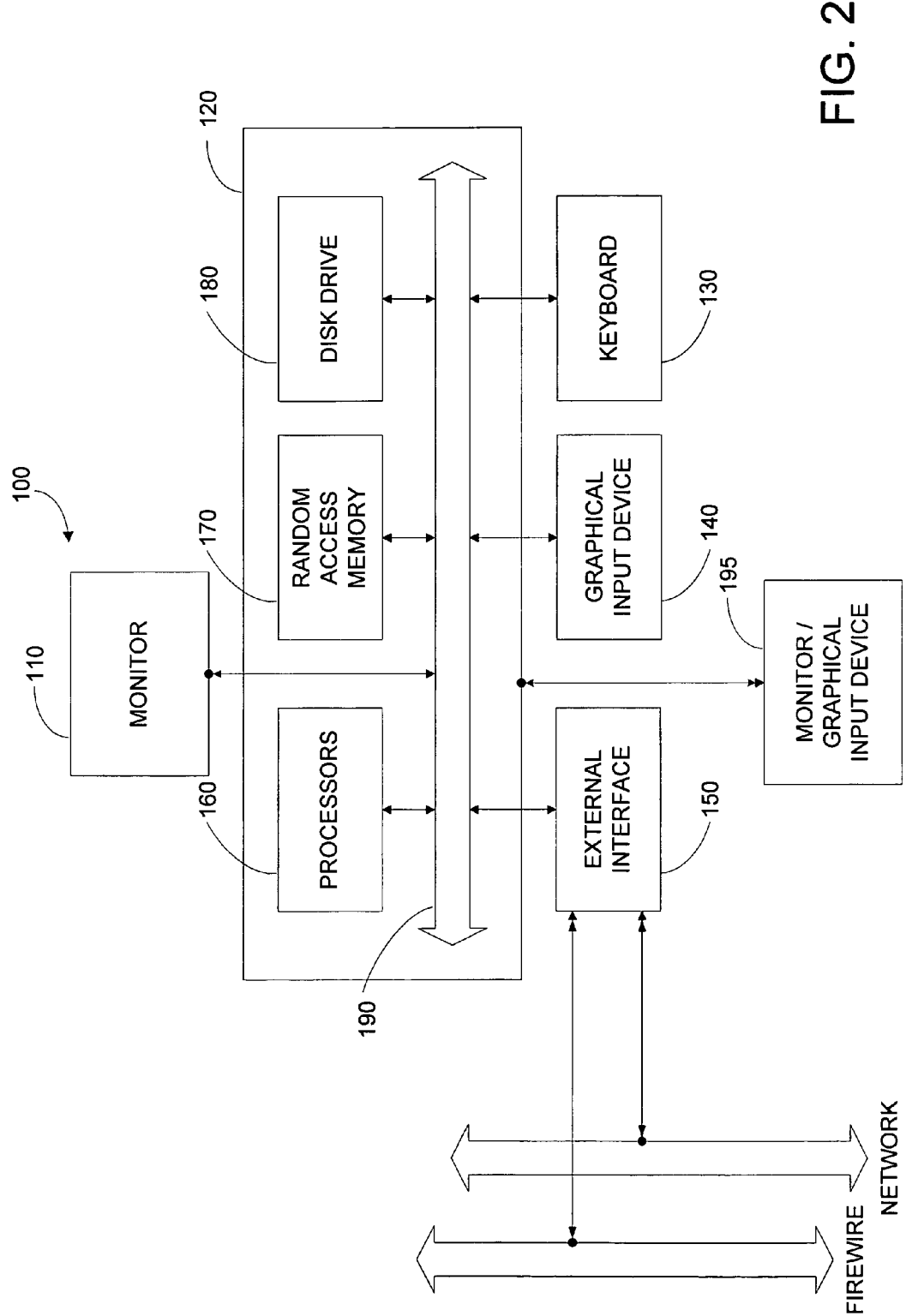

FIG. 2 is a block diagram of typical computer system 100 according to an embodiment of the present invention.

In the present embodiment, computer system 100 typically includes a monitor 110, computer 120, a keyboard 130, a user input device 140, computer interfaces 150, and the like.

In the present embodiment, user input device 140 is typically embodied as a computer mouse, a trackball, a track pad, a joystick, wireless remote, drawing tablet, voice command system, eye tracking system, and the like. User input device 140 typically allows a user to select objects, icons, text and the like that appear on the monitor 110 via a command such as a click of a button or the like. In FIG. 2, an integrated display and graphical input device 195 is also shown, and embodied as a Wacom Cintiq user interface device.

Embodiments of computer interfaces 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120, may be a software program, such as soft DSL, or the like.

In various embodiments, computer 120 typically includes familiar computer components such as a processor 160, and memory storage devices, such as a random access memory (RAM) 170, disk drives 180, and system bus 190 interconnecting the above components.

In one embodiment, computer 120 is a Power Mac G4 computer having one or more PowerPC G4 microprocessors. Further, in the present embodiment, computer 120 typically includes a MAC OS operating system.

RAM 170 and disk drive 180 are examples of tangible media configured to store data such as video files, user interfaces, graphical annotations, voice/sound files, computer programs, such as embodiments of the present invention, asset management systems, databases and database management systems, and the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 2 is representative of a computer system capable of embodying the present invention. More specifically, computer system 100 is an Apple Macintosh computer, running proprietary software developed internally for this application. The custom software program reads and stores the incoming DV stream. Additionally, the "sketch" software provides the functionality discussed below including reading and storing the sketches from the users. It will be readily apparent to one of ordinary skill in the art that many other hardware and software configurations are suitable for use with the present invention. For example, the computer may be a desktop, portable, rack-mounted or tablet configuration. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like.

Figure 3A:
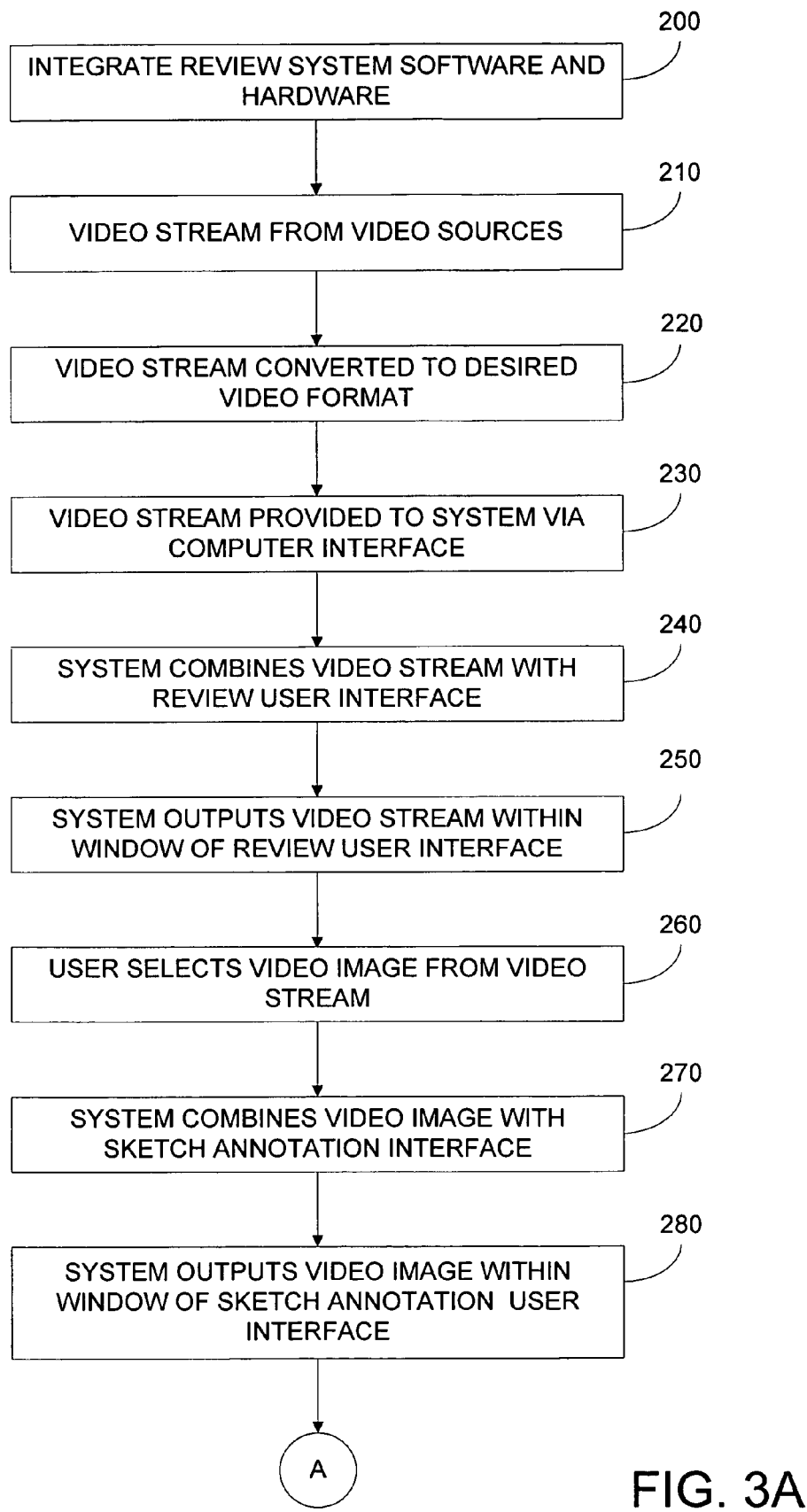
Figure 3B:
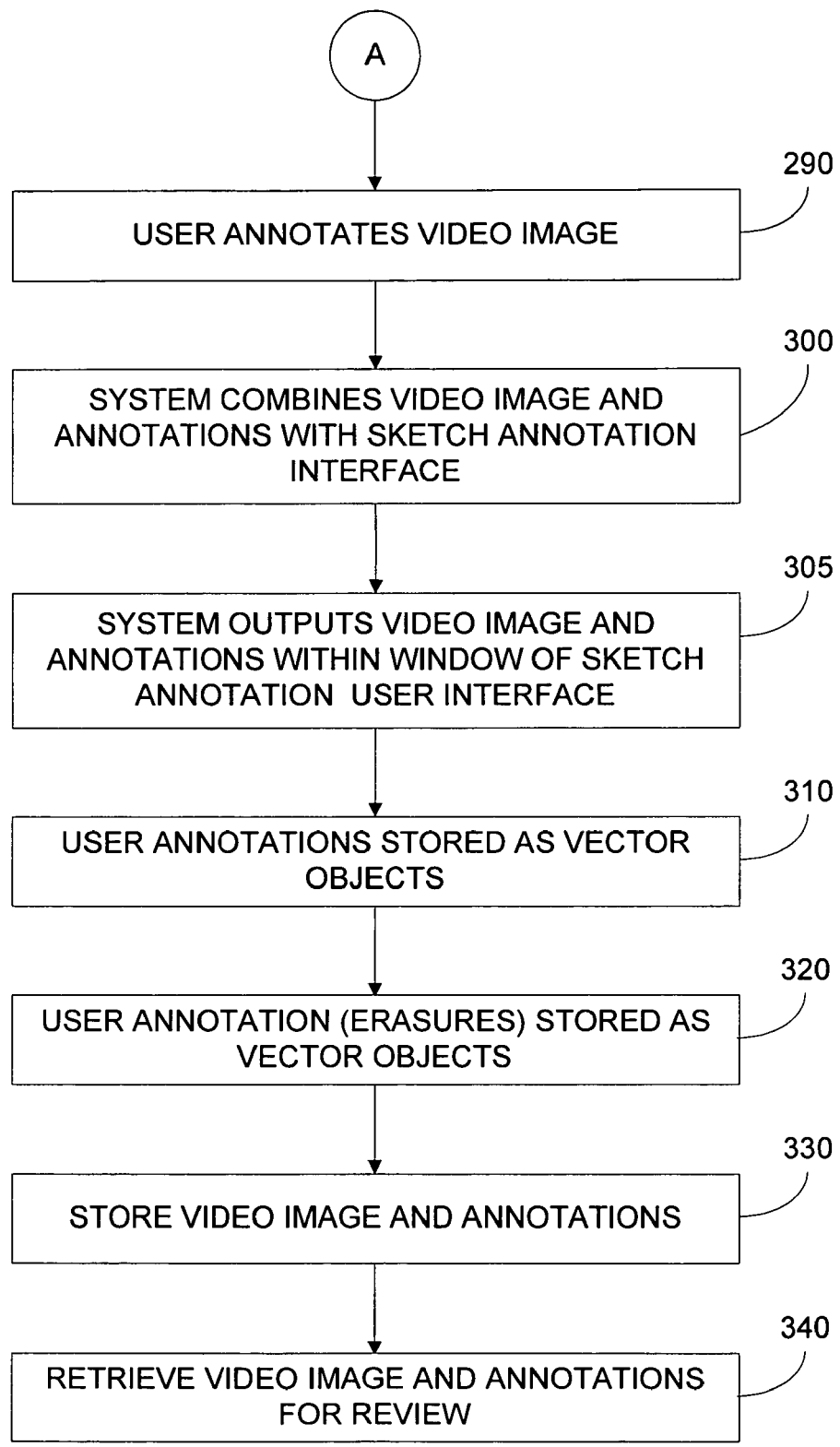

FIGS. 3A-B illustrate a block diagram of a process according to one embodiment of the present invention. Specific reference to elements in FIG. 1 are provided.

Initially, various components illustrated in FIG. 1 are provided and coupled as illustrated, step 200.

Next, a video data stream is provided by one of video data sources 20, step 210.

Embodiments of the present invention are designed to support annotation of different video signals that might be under review in a screening room. In various embodiments, these video sources might include animation clips running on a Xenon-based workstation, models from a Linux-based system, storyboard panels displayed from a Macintosh-base computer, or the like. In various embodiments the different video sources are connector to a VGA switch that routes the video source image to a number of output sources (e.g. the projector, or one of many computer monitors).

In embodiments of the present invention, the video data stream include a limited number of video images that play over-and-over (loop). For example, the video stream may include video images that represent a "shot" or a "scene" of a feature, or the like. Additionally, the video stream may be as short as 1 or 2 seconds or less, and may be as long as desired. As mentioned, in the present embodiments, the video data stream typically loops over and over, until the review of the series of video images is complete.

In the present embodiments, the video data stream is then converted by video switch/converter 40 into Digital Video (DV) format, step 220. As discussed, the display format (resolution, bit-rate, etc.) may be different in alternative embodiments. Further, the encoding format (DV, NTSC, MPEG-4, etc.) may also be different in alternative embodiments. The resulting video data is then provided to server 30, step 230.

Next, in various embodiments, server 30 receives the converted video, and combines the converted video with a first graphical user interface to form a "first review user interface," step 240. Server 30, then outputs the first review user interface to users, step 250. For example, server 30 outputs the review user interface to user display device 80, to users at user interface devices 50, 70, or the like. As will be illustrated below, in one embodiment, the converted video data stream appears as a window within the review user interface. The remaining portions of the review user interface are portions of the graphical user interface that allow users to make commands, and the like.

In the present embodiment, as users at user interface devices 50, 70, or the like, view the converted video data within the review user interface, there may be a video image a user wishes to comment upon. To do so, the user may take a "snapshot" of the video image or "freeze" the video image, step 260. A user may do this by clicking directly upon the portion of the review user interface where the video data stream appears, or upon an graphical icon of the review user interface. In various embodiments, the user uses a graphical input device of user interface devices 50, 70, or the like.

In the present embodiment, after a snapshot of the video image, the video image is displayed within a different user interface, as will be illustrated below, step 270. In the examples below, a number of different annotation capability are provided, such as drawing tools, multiple video image handling tools, and the like. In this embodiment, the second review user interface is then provided to users at user interface devices 50, 70, or the like, in addition to user display device 80, step 280.

In the present example, a user at user interface devices 50, 70, or the like, uses a graphical input device to make one or more annotation commands (e.g. sketches) to server 30, step 290. For example, the user may select a pen tool with yellow ink, the user may draw upon the video image with a tool, the user may return to viewing the video data stream, and the like. Examples of annotation commands are illustrated below.

The various annotations made by different users are received by server 30. Next, server 30 combines the annotations, step 300, and displays the annotations on top of the video image in the review user interface, step 305. As an example, a first user may draw red lines on top of a video image and a second user may draw yellow circles on top of a video image. The server combines the annotations and outputs both the red lines and yellow circles on top of the video image back to the first user and second user. In this way, users can collaborate during the review process.

In the present invention, the annotation commands are converted into vector-based objects, to reduce storage requirements of the annotations, step 310. In some embodiments, a user may "erase" annotations, for example, if an sketched line is too long. To do so, the users uses the erasing tool to "erase" the portion of the annotation command desired. In the present embodiment, "erasures" are also stored as vector-based objects, step 320. Further details about this process is described below.

In the present embodiment, the review session data, including the video image, annotations (e.g. sketches) from the different users, erasures from the different users, and the like, are associated in memory, and stored in server 30, step 330.

In embodiments of the present invention, the review session data are typically available for later review and may be immediately available to other users on a network, step 340. In various embodiments, server 10 can act as a web server providing access to the review session data; a separate server may provide access to the review session data; a database may provide subsequent access to the review session data; an asset management system may provide access to the review session data, and the like.

In various embodiments, users' annotations or sketches may be stored in several different ways. One way is a composite image of the background image and the sketch; another way is simply the background image, and another way is simply a vector representation of the sketches. These data are associated in memory. In some embodiments, the background image alone may be useful in cases where the sketches obstruct relevant elements of the scene. In embodiments, the annotations may be used to as an overlay upon other types images, for example, the annotations may be used as an overlay on top of a scene generation environment (e.g. Maya) so a user can conform the scene to the annotation; and the like.

In additional embodiments, a sketch may be overlaid on top of a video stream. For example, if a sketch was created above a local Quicktime movie, the sketch can also be overlaid on top of the Quicktime movie. With such embodiments, the artist can choose whether to view the sketch over the single background image or the video, depending if the critique was in reference to the single frame or the entire clip.

In various embodiments, the sketches are typically grouped by review session and typically sorted by creation order. If additional information is desired, a user in charge of the review can create an "agenda," a list of items that will be reviewed. In such cases, when the review moves from item to item, the current agenda item is incremented. Additionally, each sketch is associated with its agenda item. Accordingly, when a user subsequently reviews the sketches, the user may do so by agenda item, or otherwise (i.e., shot number, character model, etc.).

FIG. 4 illustrates a graphical interface according to embodiments of the present invention. More specifically, FIG. 4 illustrates a review user interface 400 during a video playback mode. In this embodiment, during the video playback mode, the video data stream is played in window 410. Also shown in review user interface 400 are user selectable icons 420. In this embodiment, the user interface is uncluttered and allows the users to more easily focus upon reviewing the video images of the video data stream.

In this embodiment, one user selectable icon is, a "New Sheet" button 430 that commands system 30 to take a "snapshot" of the current frame of video, or freezes the current video image for subsequent reviewing. In various embodiments, the user interface (UI) is controllable via a drawing tablet interface. In various embodiments, when the system is in video playback mode and a user selects the "New Sheet" button, a snapshot of the current frame of video is taken, a sheet to overlay sketches on this snapshot is created, and the system switches to a "sketching mode," as described below. In other embodiments, these actions may be performed separately or in response to different user inputs.

Figure 5A:
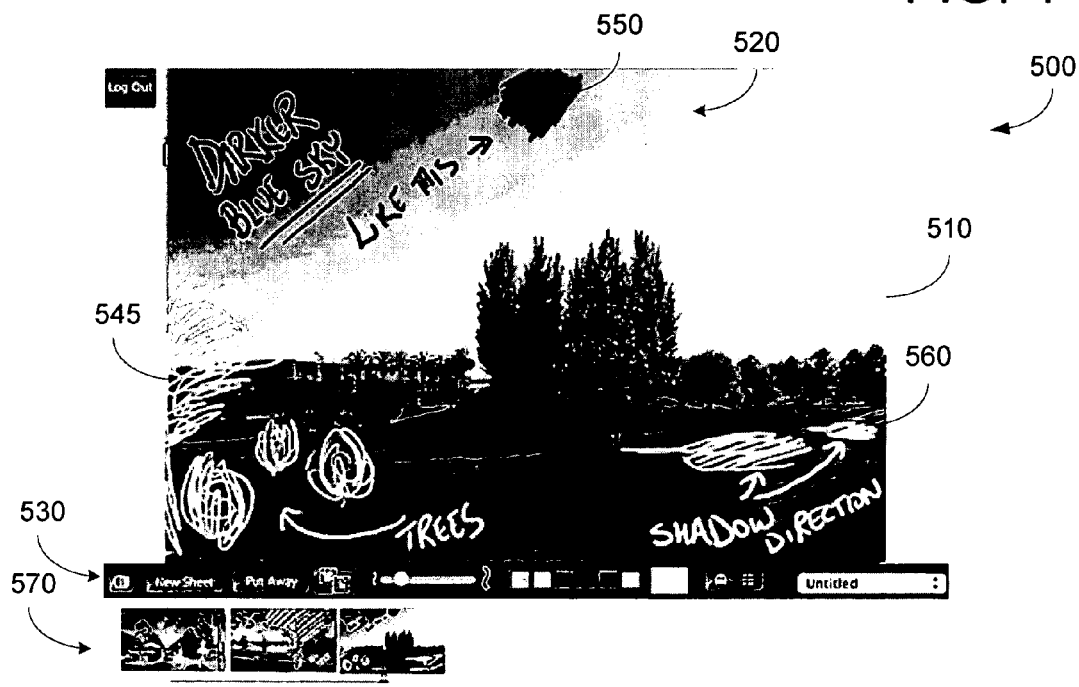

FIGS. 5A-E illustrate another graphical interface according to embodiments of the present invention. More specifically, FIG. 5A illustrates a review user interface 500 during a sketching or annotation mode. In embodiments of the present invention, a central window 510 displays the reference snapshot video image. As the user sketches on central display window 510, the sketch or annotation data 520 is also displayed.

FIG. 5A illustrate a example of a video image combined with user (e.g. Director) sketches 520, or the like. As can be seen, a number of user comments are entered, such as some comments suggesting addition of new elements to the scene 545, changing of object colors 550, changing positions of existing elements 560, and the like. Many other types of additions or modifications to a video image based on graphical user input are contemplated.

In the present embodiments, a simple set of drawing tools 530 and are provided to the user, FIG. 5B. Such tools may include letting the user (e.g. Director) to choose a width of a pen for the sketches, line colors, and the like. In this example, the user sketches by dragging a cursor (via the pen on the tablet) in central window display 510. In other embodiments, other conventional user interface, such as a trackball or mouse, may be used to drag a cursor in central window display 510.

In FIG. 5B, one specific command provided is a "Put Away" button 540. In this embodiment, this command directs system 30 to store the current video image snapshot and the overlay sketches in memory. Additionally, the system may automatically return to the video playback mode illustrated in FIG. 4.

FIG. 5C illustrates a portion 570 of review user interface 500. In various embodiments, a series of thumbnail images can be displayed to the user, these thumbnail images may be background images or sketches, or both. In the present embodiments, the user requests a full-sized image of the image and sketch to be displayed in the central window by selecting upon a thumb nail image. In the present embodiment, portion 570 may also be part of review user interface 400. In such an embodiment, when a user taps on a thumbnail, the system enters "sketching" mode and displays the selected sketch.

In the embodiment in FIG. 5C, video images 580 that were previously commented upon, (or merely extracted from the video stream) are shown in portion 570. This allows users to quickly move back and forth (via sliders or direct selection) between video images that were previously captured or annotated. For example, a user may wish to compare a current video image with a previously annotated image for consistency purposes, or the like.

FIG. 5D illustrates an example of a pop-up window 590 that may be presented to users when a "ghosting" icon 600 is selected in review user interface 500. To provide this functionality, when in sketch mode, a "background selector" button is provided to the user. In the present embodiment, selection of this button toggles or cycles the image displayed in the central window.

Next, in this embodiment, pop-up window 590 allows the user to modify "ghosting controls" such as the number of frames for a ghosting mode. As illustrated in FIG. 5E, in a ghosting mode, a number of annotation or sketch sheets may be placed on top of central display window 510 to illustrate different changes over time, adjacent sketches 610 can be simultaneously displayed as a visual reference for the user. In this example, the ghosting mode allows the user to show motion across the video image, when sketching a path for a character to follow in a scene, or the like. Other uses for the ghosting mode are contemplated in additional embodiments.

In FIGS. 4 and 5A-E, a login/logout button 440 is typically provided for users. As users login and log out, system 30 knows which user is entering the sketches or annotations. This information is useful for subsequent review. For example, a Director may specify a certain change, whereas a cinematographer may specify a different change, and the Director agree that the cinematographer's change should be made. In such as case, a user reviewing the annotations would have to know which changes belong to the Director, which belong to the cinematographer, etc.

The inventors of the present invention have recognized that the user sketches may be stored in a variety of ways including raster-based images or vector-based images. As is known, raster-based images are typically divided up into a fixed grid of pixels, each with a color. In a raster-based system, when a user draws a pen-stroke or the like, values for pixels in the grid are changed to the desired color. When erasing portions of a sketch, the values for pixels in the grid are reverted back to the original background color.

In contrast, with vector-based images, pen strokes are not stored as pixels directly; instead, a vector representation of the stroke is stored. Only when the stroke is displayed on a display are the vector representations converted into pixel values. The inventors have recognized that advantages to storage of sketches as vector objects include: that strokes can be easily moved, deleted, or changed in color at any point; that strokes can be arbitrarily rescaled with no loss of visual fidelity; that vector data can be stored in dramatically smaller files than bit-mapped images; and the like.

One problem with using vector representations of sketches discovered by the inventors is the problem with erasing objects. For example, previously, portions of vector objects could not be deleted or erased, but instead only the entire vector object could be erased. In light of this problem, the inventors have invented a method for vector-based pixel level erasing using image compositing.

In embodiments of the present invention, a vector image format is used where two types of strokes are stored: pen strokes and eraser strokes. When in a pen draw mode, as the pen generates strokes, the pen strokes are drawn to an image buffer. When in an erase mode, as the eraser portion of the pen generates eraser strokes, these strokes clear the respective portions of the image buffer. In the present embodiments, the pen strokes and the eraser strokes are composited into the image buffer in the order they were originally drawn by the user. Additionally, eraser strokes may overwrite any region of a pen stroke drawn before it. With embodiments of the present invention, this technique retains advantages of vector-based images (per-stroke information, arbitrary resizing, etc.) and retains advantages of raster-based per-pixel erasing capability. What is stored in memory in not necessarily the image overlay buffer data, but the vector representation of the strokes.

Many changes or modifications are readily envisioned. In light of the above disclosure, one of ordinary skill in the art would recognize that more than one user may make visual annotations and sketches at a time. In such cases, the sketches from the different users may be stored and associated with the respective background images, as described above. Additionally, the reviewing devices may be mixed. For example, a first user may use an integrated display and drawing tablet; another user may simply use a track ball, a wireless mouse, or the like; another user may use a tablet-type computer, and the like.

In embodiments of the present invention, sources of video are converted into a DV format video stream, and the snapshot images are captured from the DV video. In various embodiments, the DV video stream includes 740×480 resolution video images, although higher resolution images such as 1600×1200 may also be used. In some embodiments where high-resolution images and high-resolution computer screens are used in the system, different video transport mechanisms than DV, such as Virtual Network Computing (VNC) protocol can be used. In such embodiments, the VNC protocol transmits a high-resolution image with little visual degradation. Additional embodiments of the present invention may support both DV input and VNC clients. In such examples, the remote desktop machine may also be controlled by the user (moving windows, opening menus, etc.) and when a sketch is created, the background image is captured from the full-screen image of the remote machine.

In additional embodiments, the system may have direct support for access to video stored in local files such as Quicktime, DivX, or the like. In specific embodiments, a Quicktime player built into the system may be directly controlled by the user (e.g. the director) to control video playback and to capture images.

In other embodiments, users may be at remote locations. For example, some users may be in the same room as the computer system (in California), some users may be participating via computer network from a different location (in New York), and the like. In embodiments when more than one user makes annotations, the system will know which annotations are provided by which users. In one example, the system may keep a separate overlay for each user for storing the annotations, accordingly comments from specific users can easily be retrieved. In another example, the system may restrict colors available for each user, so that annotations from different users have different colors, and the like.

In various embodiments above, reference was made to a user such as a Director, however it should be understood that the user may be any person, such as a feature Director, a shading supervisor, an animation supervisor, a test audience member, shader, animator, or the like.

In embodiments of the present invention, techniques may be implemented in any number of computer systems. Additionally, the video input may be received from any number of video sources, computers, and the like.

The usefulness of the system described in the present patent disclosure was successfully demonstrated during the production of the animated feature "Finding Nemo" (2003). However, it should be understood that the system can be used in other embodiments than just animation. For example, the system may be applied for live action features, for special effects, or the like and provide similar benefits.

Further embodiments can be envisioned to one of ordinary skill in the art after reading this disclosure. In other embodiments, combinations or sub-combinations of the above disclosed invention can be advantageously made. The block diagrams of the architecture and graphical user interfaces are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer system comprises:
a video source configured to provide video data, wherein the video data comprises a plurality of video images;
a server coupled to the video source, wherein the server is configured to form a first review user interface comprising a first region including a video image from the plurality of video images, and a second region including a first graphical user interface; and
a first user interface device coupled to the server, wherein the first user interface device includes a display configured to display the first review user interface to a user, wherein the first user interface device includes a user input device configured to receive from the user, a first user selection of a plurality of display locations within the first region; and wherein the user input device is also configured to receive from the user, a second user selection of a display location within the second region;
wherein the second user selection is associated with a desired user command;
wherein the server is also configured to perform the desired user command in response to the second user selection, wherein the server is also configured to modify values of at least some of the plurality of display locations in response to the first user selection, wherein the server is configured to form a modified first review user interface in response to at least some of the plurality of display locations with modified values, wherein the server is configured to determine a plurality of vector objects in response to the plurality of display locations, and wherein the server is configured to associate and store a user annotation comprising the plurality of vector objects with the video image;
wherein the plurality of vector objects include drawing vector objects and deletion vector objects; and
wherein the display of the first user interface device is also configured to display the modified first review user interface.

2. The computer system of claim 1 further comprising:
a second user interface device coupled to the server, wherein the second user interface device includes a display configured to display the first review user interface to another user, wherein the second user interface device includes a user input device configured to receive from the other user, a third user selection of another plurality of display locations within the first region; and wherein the user input device is also configured to receive from the other user, a fourth user selection of another pixel within the second region;
wherein the fourth user selection is associated with another desired user command;
wherein the server is also configured to perform the other desired user command in response to the fourth user selection, wherein the server is also configured to modify values of at least some of the other plurality of display locations in response to the third user selection, wherein the server is configured to form another modified first review user interface in response to at least some of the other plurality of display locations with modified values, wherein the server is configured to determine another plurality of vector objects in response to the other plurality of display locations, and wherein the server is configured to associate and store another user annotation comprising the other plurality of vector objects with the video image; and
wherein the display of the first user interface device is also configured to display the other modified first review user interface.

3. The computer system of claim 1 wherein the video source comprises:
a video output source configured to output the video data in a first format; and a converter coupled to the video output source, wherein the video converter is configured to convert the video data from the first format to video data in a second format.

4. The computer system of claim 3 wherein the second format is a format selected from the group consisting of: PAL, NTSC, SXGA, HD, XGA, UXGA.

5. The computer system of claim 1 further comprising a storage server coupled to the server configured to retrievably store the user annotation associated with the video image, and the plurality of video images.

6. The computer system of claim 1 wherein the first user interface device is selected from the group consisting of: a tablet-style computer, a Cintiq interactive pen display, a separate display and cursor control device, a touch-screen display.

7. The computer system of claim 1 wherein the desired user command is selected from the group consisting of: selection of the video image from the plurality of video images, logging into the server, selection of a color for the user annotation, selection of a line width for the user annotation, completing annotation of the video image, combining more than one video image at a time within the first region.

8. The computer system of claim 1
wherein the sewer is also configured to form a second review user interface comprising a first region including the plurality of video images, and a second region including a second graphical user interface; and
wherein the display of the first user interface device is also configured to display the second review user interface.

9. A method for a computer system comprises:
receiving video data from a video source, wherein the video data comprises a plurality of video images;
combining the plurality of video images with a first graphical user interface to form a first review user interface;
displaying the first review user interface to a plurality of users on user display devices;
receiving a first command from a user from the plurality of users from a user input device;
determining a video image from the plurality of video images in response to the first command;
combining the video image with a second graphical user interface to form a second review user interface;
displaying the second review user interface to the plurality of users on user display devices;
receiving a second command from the user from the user input device;
determining annotation parameters in response to the second command;
receiving a graphical selection of annotation positions on the second review user interface associated with the video image from the user from the user input device;
determining a plurality of vector objects in response to the graphical selection of the annotation positions on the second review;
determining annotation positions in the video image in response to the graphical selection of annotation positions on the second review user interface;
modifying values of pixels associated with the annotation positions in the video image to form an annotated second review user interface in response to the annotation parameter;
displaying the annotated second review user interface to the plurality of users on user display devices; and storing the video image, and the plurality of vector objects in memory;
wherein the plurality of vector objects include drawing vector objects and deletion vector objects.

10. The method of claim 9 wherein receiving video data from a video source comprises:
receiving the video data in a first format from the video source; and
converting the video data from the first format to video data in a second format.

11. The method of claim 10 wherein the first format is a format selected from the group consisting of: PAL, NTSC, SXGA, HD, XGA, UXGA, s-video.

12. The method of claim 9 further comprising:
retrieving the video image and the plurality of vector objects from memory; and
displaying a combination of the video image and a representation of at least some of the plurality of vector objects on a display.

13. The method of claim 9 wherein a user display device and a user input device are selected from the group consisting of: a tablet-style computer, a Cintiq interactive pen display, a separate display and cursor control device, a touch-screen display.

14. The method of claim 9 wherein the annotation parameter is selected from the group consisting: selection of a color for the user annotation, selection of a line width for the user annotation.

15. A computer program product for a computer system including a processor comprises:
code that directs the processor to receive video data from a video source, wherein the video data comprises a plurality of video images;
code that directs the processor to determine a video image from the plurality of video images in response to a command from a user at a user input device;
code that directs the processor to combine the video image with a first graphical user interface to form a first review user interface;
code that directs the processor to output the first review user interface to a plurality of users on user display devices;
code that directs the processor to receive a graphical selections of positions on the first review user interface associated with the video image from the user from the user input device;
code that directs the processor to determine positions on the video image in response to the graphical selection of positions on the first review user interface;
code that directs the processor to modify values of pixels in an overlay layer associated with the positions in the video image to form an annotated first review user interface;
code that directs the processor to output the annotated first review user interface to the plurality of users on user display devices; and
code that directs the processor to store the video image in memory
code that directs the processor to convert the positions in the video image into a plurality of vector objects, wherein the plurality of vector objects comprises drawing vector objects and deletion vector objects;
wherein the codes reside on a computer-readable tangible media.

16. The computer program product of claim 15 wherein the tangible media includes code that directs the processor to store the video data in the memory.

17. The computer program product of claim 15 further comprising:
   code that directs the processor to determine values of pixels in the overlay layer in response to the plurality of vector objects.

18. The computer program product of claim 15 wherein a user display device and the user input device are selected from the group consisting of: a tablet-style computer, a Cintiq interactive pen display, a separate display and cursor control device, a touch-screen display.

19. The computer program product of claim 15 wherein the user display devices are electronically coupled to the computer system in a manner selected from the group consisting of: direct connection, across a local area network, across a wide area network, across the Internet.

20. The computer program product of claim 15 further comprising:

code that directs the processor to combine the video images with a second graphical user interface to form a second review user interface;

code that directs the processor to output the second review user interface to the plurality of users on the user display devices; and code that directs the processor to determine a graphical selection on the second review user interface from the user using the user input device;

wherein code that directs the processor to determine the video image from the plurality of video images comprises code that directs the processor to determine the video image from the plurality of video images in response to the graphical selection.

* * * * *